(12) United States Patent
Chang

(10) Patent No.: US 12,476,581 B1
(45) Date of Patent: Nov. 18, 2025

(54) SOLAR PANEL BRACKET FASTENING DEVICE

(71) Applicant: Chun-Wei Chang, Tainan (TW)

(72) Inventor: Chun-Wei Chang, Tainan (TW)

(73) Assignee: JY OPTOELECTRONIC DEVICES CO., LTD.

( * ) Notice: Subject to any disclaimer, the term of this patent is extended or adjusted under 35 U.S.C. 154(b) by 1 day.

(21) Appl. No.: 18/791,440

(22) Filed: Aug. 1, 2024

(51) Int. Cl.
| | |
|---|---|
| *F16B 2/18* | (2006.01) |
| *F16B 7/18* | (2006.01) |
| *H02S 30/10* | (2014.01) |

(52) U.S. Cl.
CPC .............. *H02S 30/10* (2014.12); *F16B 7/187* (2013.01)

(58) Field of Classification Search
CPC .................................. H02S 30/10; F16B 7/187
See application file for complete search history.

(56) References Cited

U.S. PATENT DOCUMENTS

| | | | | |
|---|---|---|---|---|
| 6,827,531 | B2* | 12/2004 | Womack ............... | B60P 7/0815 |
| | | | | 410/104 |
| 7,156,593 | B1* | 1/2007 | Saward ................. | B60P 7/0815 |
| | | | | 410/104 |
| 7,401,995 | B2* | 7/2008 | Senakiewich, II .... | B60P 7/0815 |
| | | | | 403/258 |
| 7,980,798 | B1* | 7/2011 | Kuehn .................. | B60P 7/0815 |
| | | | | 410/104 |
| 10,576,868 | B1* | 3/2020 | Gilmour ............... | B60P 7/0815 |

* cited by examiner

*Primary Examiner* — Amy J. Sterling

(57) ABSTRACT

A solar panel bracket fastening device is assembled within a groove of an aluminum frame and includes a positioning frame having two positioning parts connected to two ends of a base. The width of each positioning part gradually increases from the end connected to the base towards the other end. The positioning frame is installed within the groove. The wider ends of the positioning parts press against the opening of the groove. The base rests against the inner bottom surface of the groove. A locking block is located within the groove and positioned between the two positioning parts. The locking block has a locking hole, a screw is locked into the locking block. The wider ends of the positioning parts press against the groove opening to create friction to prevent the positioning frame from detaching from the groove.

7 Claims, 7 Drawing Sheets

SOLAR PANEL BRACKET FASTENING DEVICE

FIELD OF THE INVENTION

The present invention relates to a field of solar panel technology, and more particularly, to a solar panel bracket fastening device.

BACKGROUND OF THE INVENTION

The current discussion is about the bases used to support solar panels. Typically, solar panels need to face the direction of the sun, so most solar panel installations are set up with an angle. Therefore, the bases are often constructed using multiple aluminum extrusions of varying lengths. The assembly of these aluminum extrusions usually involves screws, with the screw heads sliding into the grooves of one of the aluminum extrusions. The threaded part of the screw passes through the aluminum extrusion that needs to be joined, and the assembly is completed by locking it with a nut. Alternatively, as described in Taiwanese Patent No. M540258 "Solar Panel Bracket Fastening Structure," a combination of long locking blocks and screws can be used.

However, there is a problem with these methods. Some aluminum extrusions are positioned at an angle, making it very easy for screws and long locking blocks to slide from a high position to a lower position during assembly, disassembly, or adjustments. While it is easy to retrieve, adjust, or add screws before the solar panels and aluminum extrusions are installed, once everything is in place, this issue becomes persistent during maintenance and repairs. Therefore, preventing screws and long locking blocks from sliding due to the inclined setup of the aluminum extrusions is a core problem that needs to be addressed.

The present invention intends to provide a solar panel bracket fastening device to eliminate the shortcomings mentioned above.

SUMMARY OF THE INVENTION

The present invention relates to a solar panel bracket fastening device comprises a positioning frame having two positioning parts and a base. The two positioning parts each have a first end and a second end, wherein the two respective first ends of the two positioning parts are connected to two ends of the base. The width of the first end gradually increases towards the second end of each of the two positioning parts. The positioning frame is installed in a groove of an aluminum frame, with the second ends of the two positioning parts pressing against an opening of the groove. The base rests against an inner bottom surface of the groove. A locking block is movably installed within the groove and located between the two positioning parts of the positioning frame. The locking block has a locking hole defined therethrough.

An opening of the locking hole is located corresponding to the opening of the groove. A screw is movably locked into the locking block and includes a screw head and a shaft. The screw head is formed to one of two ends of the shaft, and another one of the two ends of the shaft passes through the opening of the groove and is locked into the locking hole of the locking block. By positioning the positioning frame in the groove of the aluminum frame, the second ends of the positioning parts press against the opening of the groove. Friction between the positioning frame and the aluminum frame is created such that the positioning frame is prevented from detaching from the groove. The locking block is confined between the two positioning parts and does not slide or fall off.

The primary object of the present invention is to prevent screws and long locking blocks from sliding from higher to lower positions on aluminum extrusions during adjustments or additions. This ensures accurate positioning of screws and proper assembly of aluminum extrusions. The improvement over known techniques addresses the issue where screws may slide off and fail to stay in place, forcing users to repeatedly retrieve screws that have slid down and measure again to ensure correct positioning, which is both time-consuming and labor-intensive, ultimately not cost-effective.

The positioning frame of the present invention prevents the locking blocks from sliding arbitrarily or detaching from the groove. The use of the positioning frame also provides users with a preset marking for the locking positions. The present invention allows users to pre-position the locking locations between aluminum frames, making it easy and quick for users to judge and assemble. Compared to the known techniques, the present invention improves upon the issue where screws and long locking blocks easily slide from higher to lower positions, causing users to spend time retrieving and adjusting them. Furthermore, when screws and long locking blocks slide, they can no longer align with the locking holes in the existing aluminum frames, requiring users to readjust the positions, which is time-consuming and labor-intensive.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
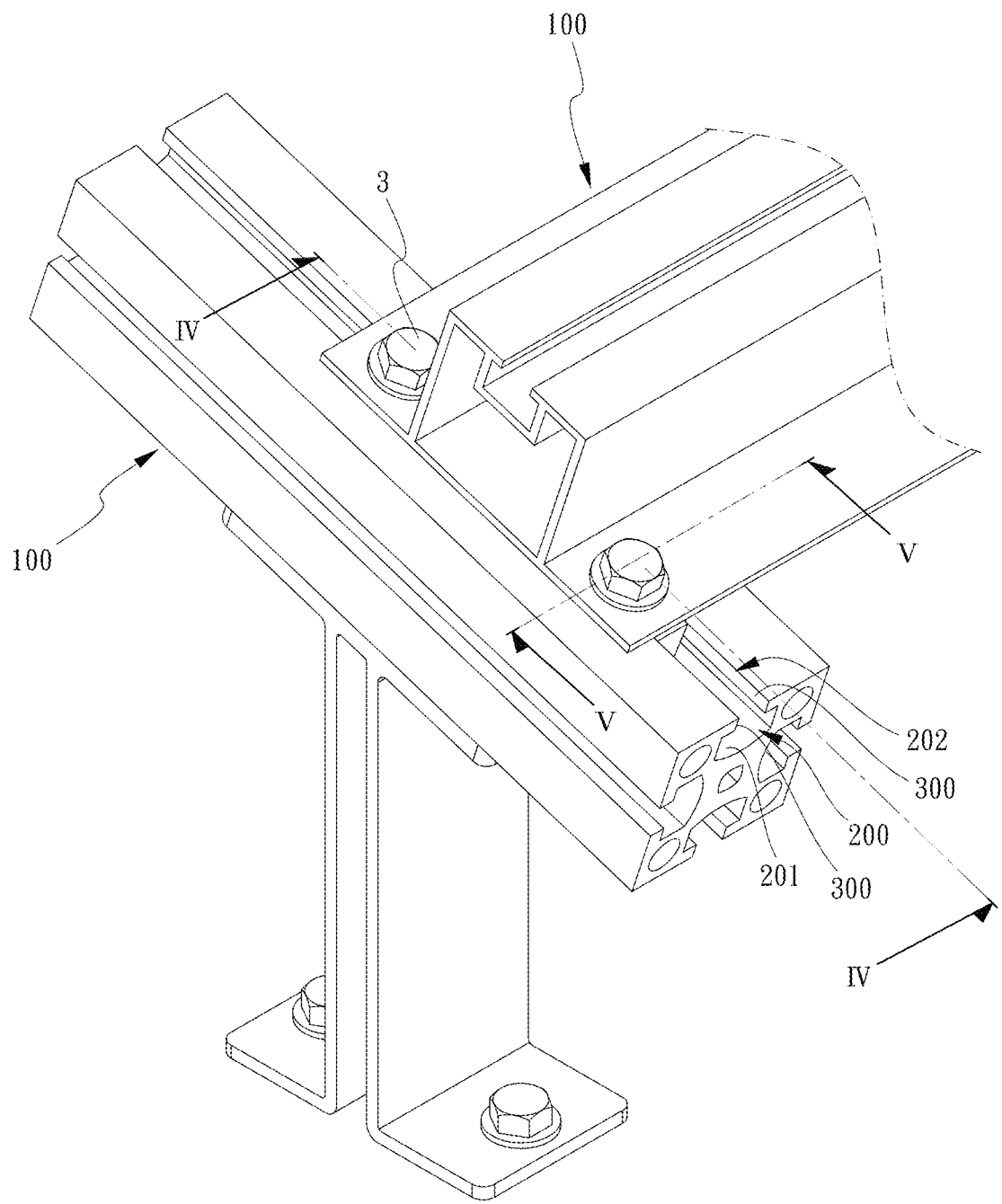
FIG. 1 is a perspective view illustrating the use of the present invention applied between aluminum frames.

Please refer to FIGS. 1 through 5, the solar panel bracket fastening device of the present invention is movably assembled in a groove (200) of an aluminum frame (100). The solar panel bracket fastening device comprises a U-shaped positioning frame (1), which has two positioning parts (11) and a base (12). The two positioning parts (11) are connected to the two ends of the base (12), and the width of each positioning parts (11) gradually increases from the end connected to the base (12) towards the other end. Specifically, the two positioning parts (11) each have a first end and a second end, the two respective first ends of the two positioning parts (11) are connected to the two ends of the base 12. The width of the first end gradually increases towards the second end of each of the two positioning parts (11). Viewed from the left and right side planes of the positioning frame (1), the two positioning parts (11) are in an inverted trapezoid shape. The positioning frame (1) is installed in the groove (200) of the aluminum frame (100), with the wider ends of the two positioning parts (11) pressing against the opening of the groove (200), and the base (12) resting against the inner bottom surface of the groove (200).

A locking block (2) is movably installed within the groove (200) and positioned between the two positioning parts (11) of the positioning frame (1). The locking block (2) has a locking hole (21) that runs through from one end to the other, with the opening of the locking hole (21) corresponding to the opening of the groove (200).

A screw (3) is movably locked into the locking block (2). The screw (3) includes a screw head (31) and a shaft (32). The screw head (31) is connected to one end of the shaft (32), and the other end of the shaft (32) passes through the opening of the groove (200) and locks into the locking hole (21) of the locking block (2).

By installing the positioning frame (1) within the groove (200) of the aluminum frame (100) and pressing the wider ends of the positioning parts (11) against the opening of the groove (200), friction is created between the positioning frame (1) and the aluminum frame (100). This prevents the positioning frame (1) from detaching from the groove (200), while the locking block (2) is confined between the two positioning parts (11) and cannot slide or fall off.

Figure 2:
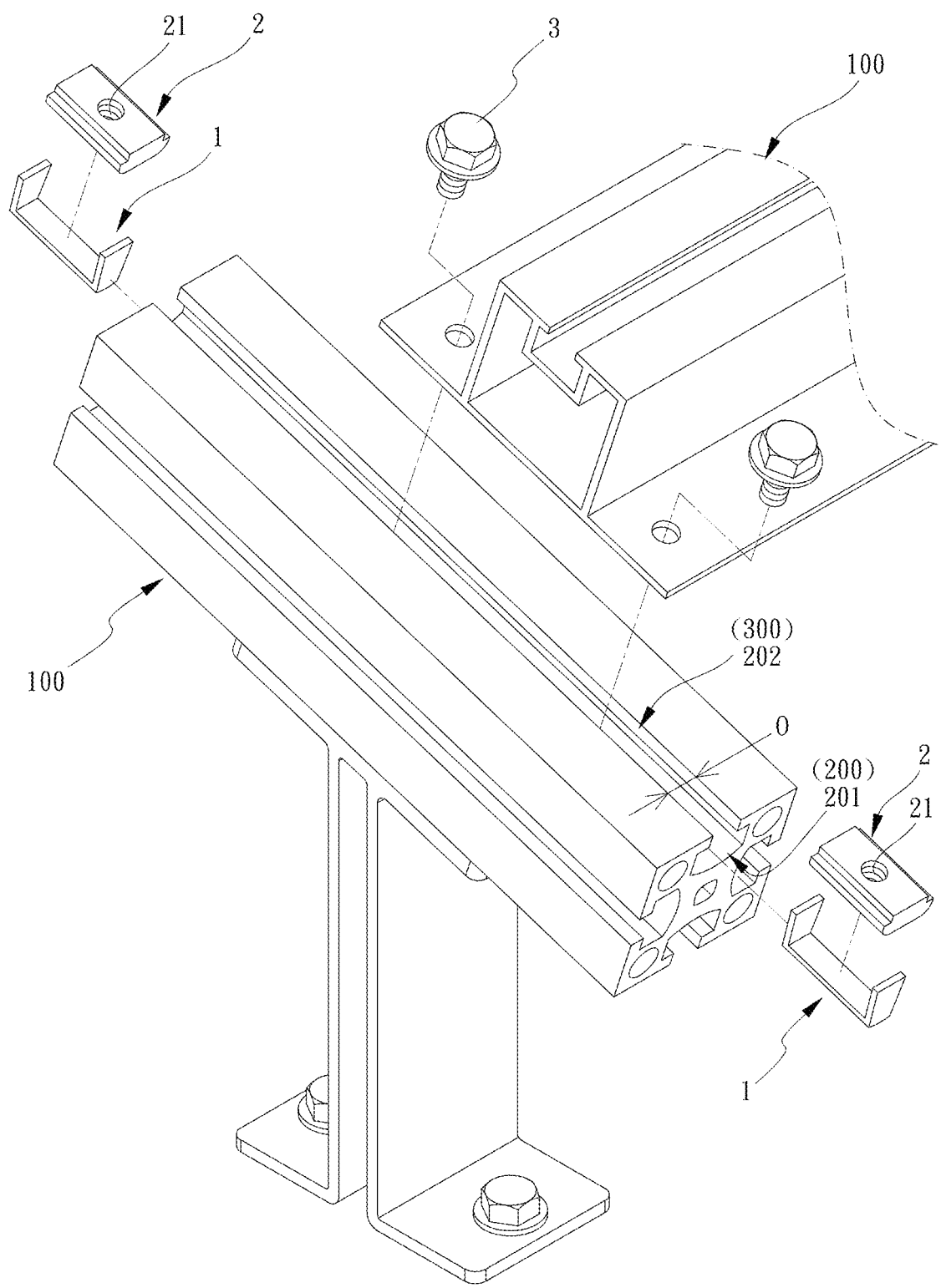
FIG. 2 is an exploded perspective view of FIG. 1.

Please refer to FIGS. 1 and 2, when users are assembling the aluminum frames (100), several positioning frames (1) are install them in the groove (200) of one aluminum frame (100). Then, place another aluminum frame (100) (with lock holes) on top of the mentioned aluminum frame (100). Check if each positioning frame (1) aligns with the portions to be locked together. If not aligned, adjustments can be made. Once the positions of the positioning frames (1) are confirmed, several locking blocks (2) are inserted into the groove (200) of the aluminum frame (100) that has the positioning frames (1). The positions of each locking block (2) need to be between the two positioning parts (11) of each positioning frame (1).

When the aluminum frame (100) with positioning frames (1) is set at an angle, the locking blocks (2) located between the two positioning parts (11) of each positioning frame (1) will not slide freely due to the pressing fit between the positioning frames (1) and the opening of the groove (200). The user only needs to simply stack the aluminum frames (100), then insert the screws (3) through the aluminum frame (100) with lock holes and lock them into the corresponding locking blocks (2) to complete the assembly of the aluminum frames (100). Due to the positioning setup of the positioning frames (1), the user does not need to worry about the sliding or detachment of the locking blocks (2) during the construction process, allowing for quick and accurate locking.

Figure 3:
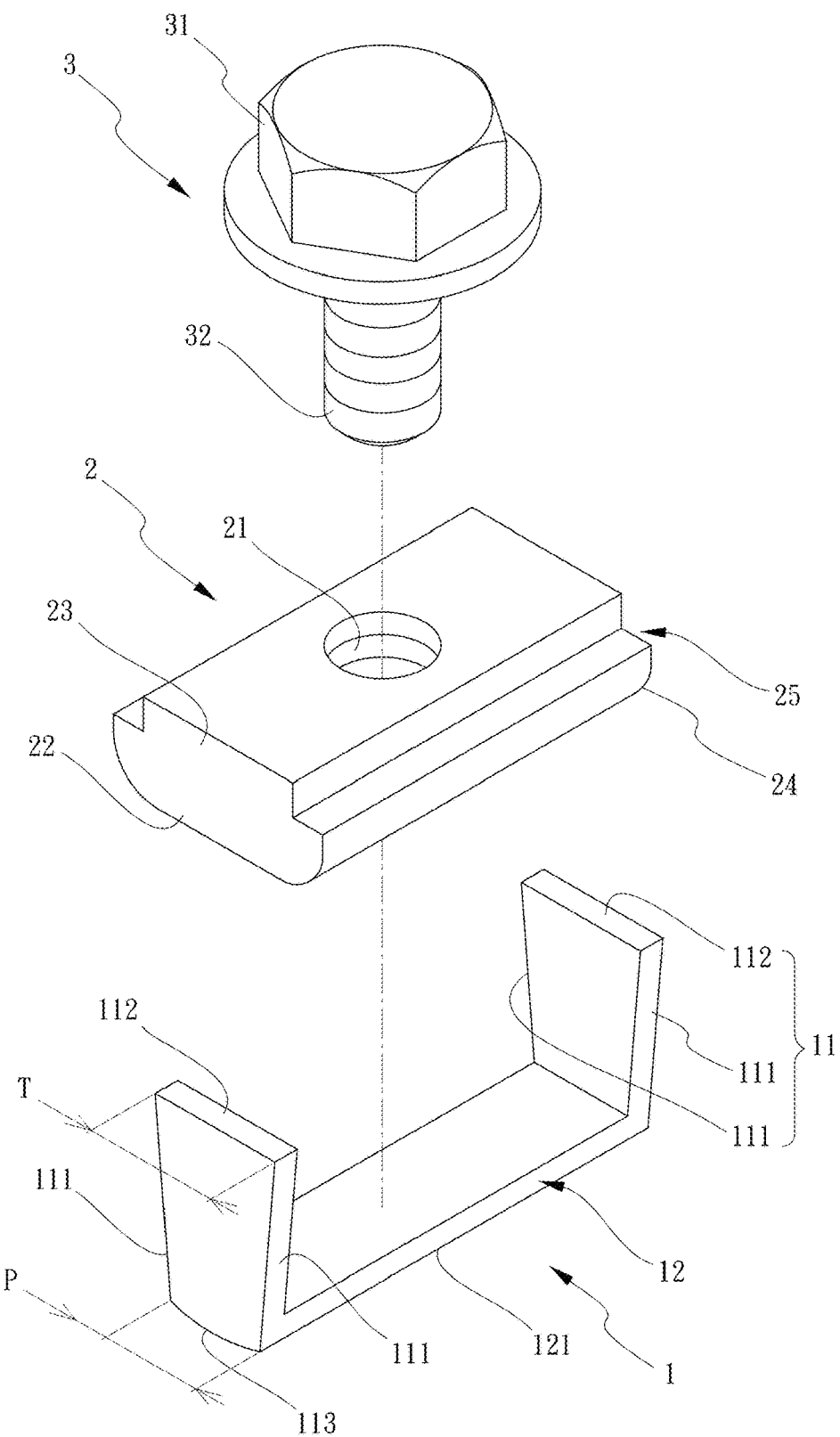
FIG. 3 is an exploded perspective view of the present invention.
Figure 4:
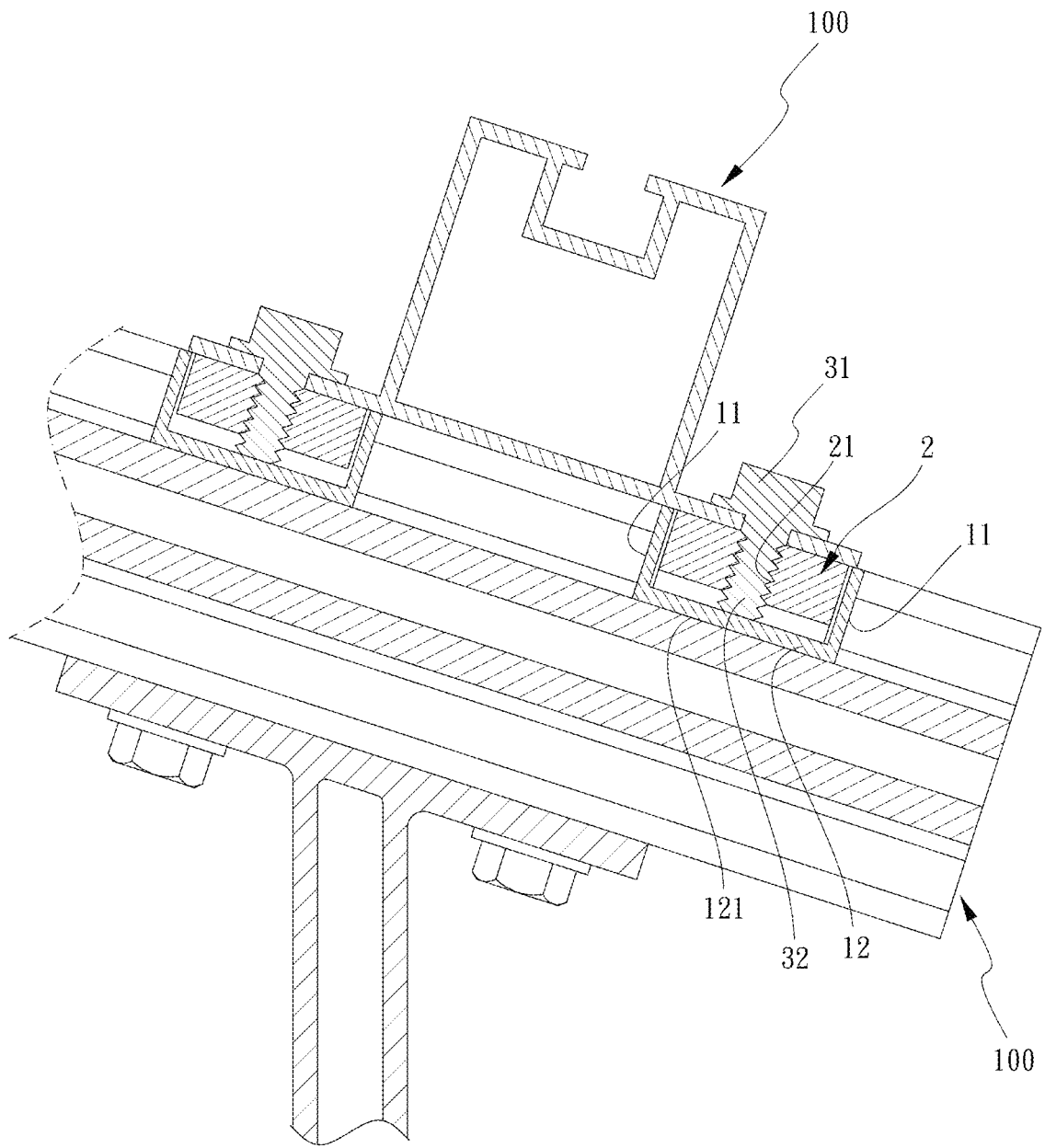
FIG. 4 is a sectional view, taken along line IV-IV of FIG. 1.
Figure 5:
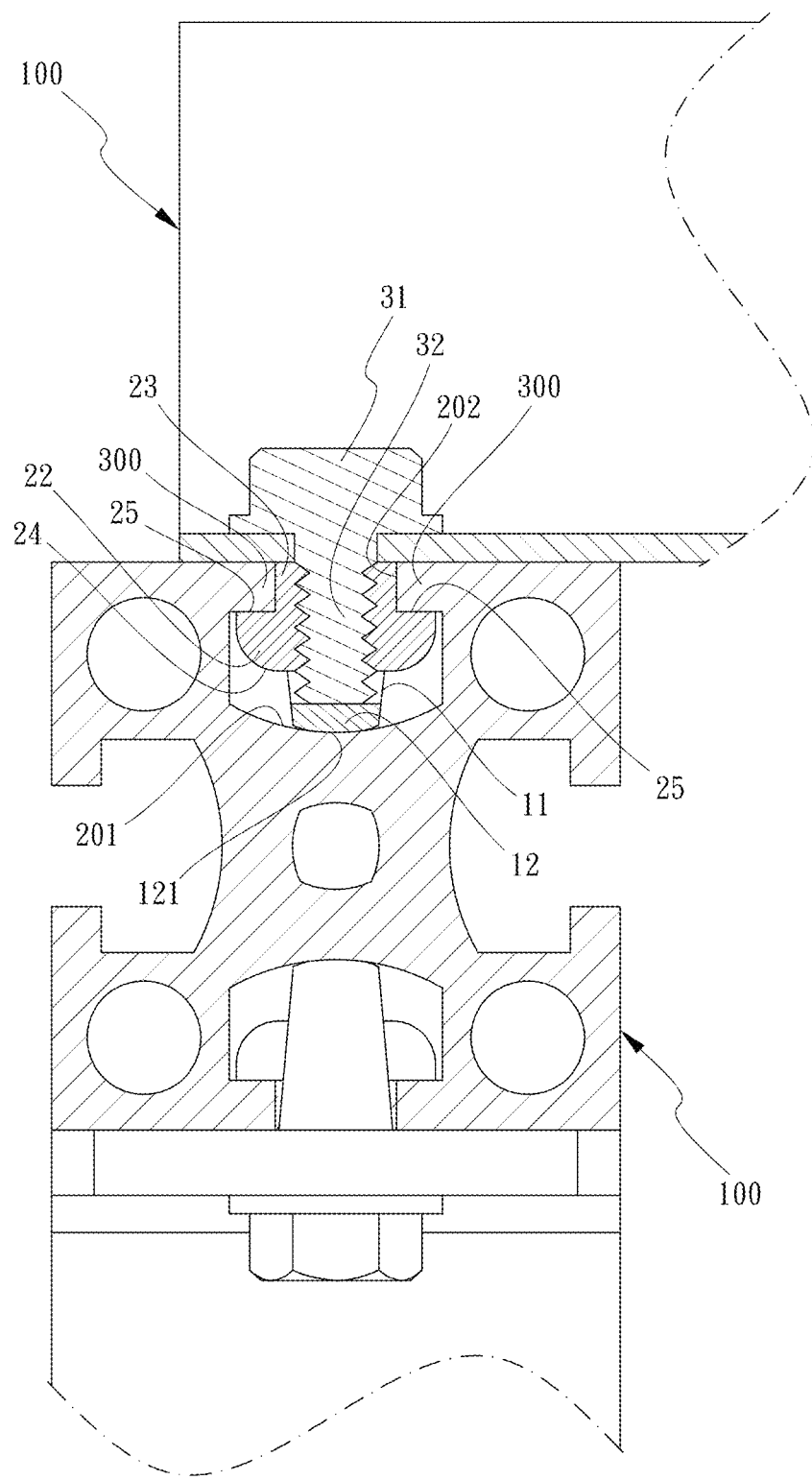
FIG. 5 is a sectional view, taken along line V-V of FIG. 1.

Please refer to FIGS. 2 and 3, in order to ensure that each positioning frame (1) can be securely assembled within the groove (200), each positioning frame (1) has two positioning parts (11) which include two side sloping edges (111), an upper wide edge (112), and a lower narrow edge (113). That is to say, the second end of each positioning part (11) is the upper wide edge (112) and the first end of each positioning part (11) is the lower narrow edge (113) which is narrower than the upper side edge (112). The lower narrow edge (113) of each positioning part (11) is connected to the base (12) (the positioning parts (11) and the base (12) of the present invention are integrally formed). Each side slanted edge (111) extends upward and outward from the ends of the lower narrow edge (113) and connects to the ends of the upper wide edge (112). The length of the upper wide edge (112) of each positioning part (11) is defined as "T", the length of the lower narrow edge (113) is defined as "P", and the width of the groove opening (200) of the aluminum frame (100) is defined as "O". The length comparison is T>O>P. Through these width settings, the opening of the groove (200) of each aluminum frame (100) can tightly press against both sides of the upper wide edge (112) of each positioning frame (1), ensuring that the positioning frames (1) do not move arbitrarily, and that the locking block (2) remains in the preset position. This allows the user to perform adjustments, retrieval, assembly, and other operations smoothly.

Figure 6:
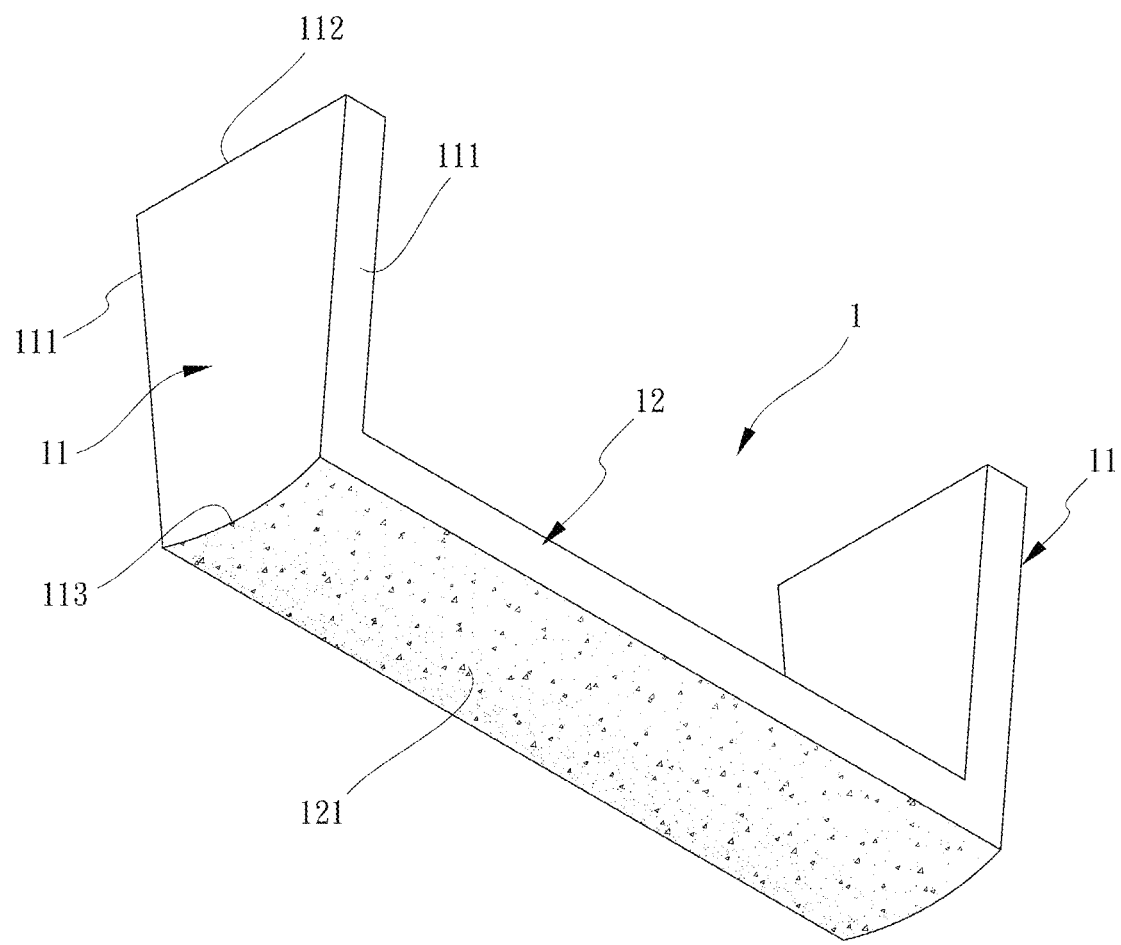
FIG. 6 is a perspective view of the positioning frame of the present invention, showing the curved bottom surface as a rough surface.
Figure 7:
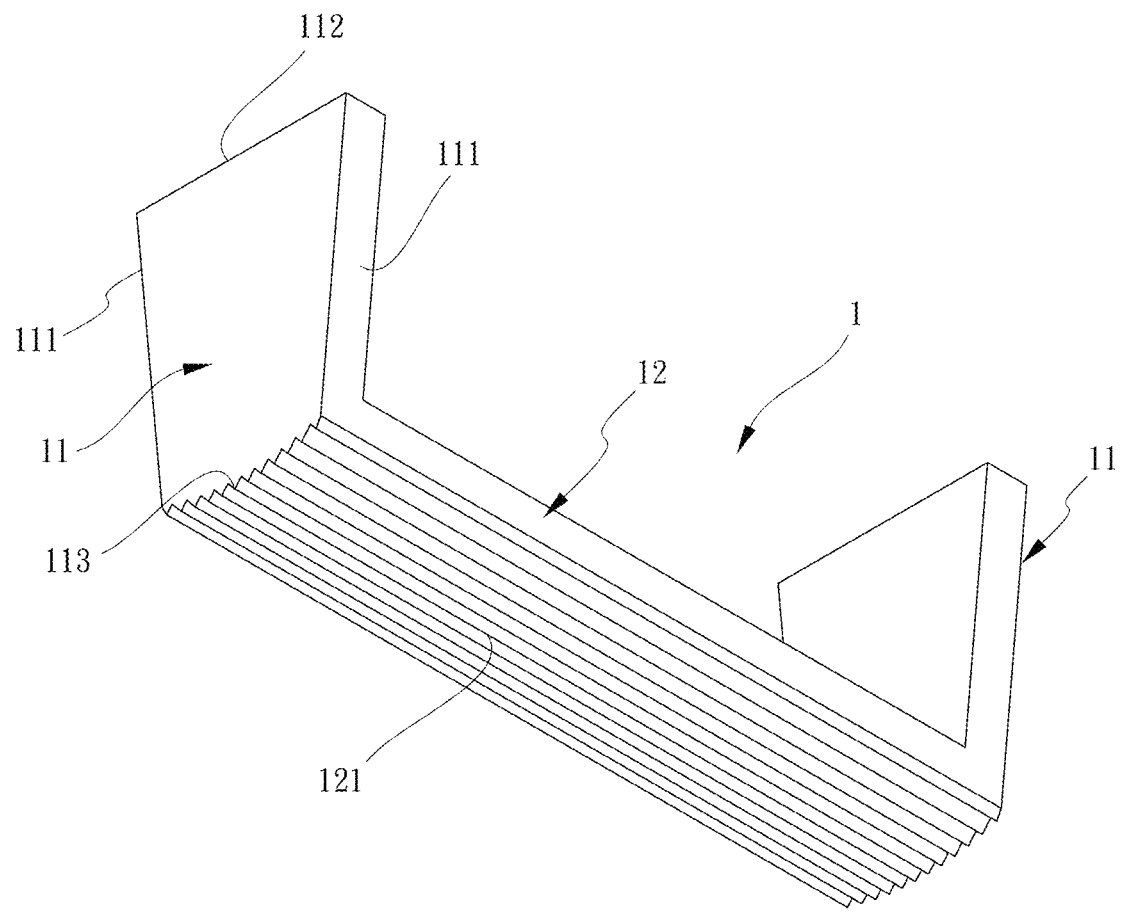
FIG. 7 is a perspective view of the positioning frame of the present invention, showing the curved bottom surface as a toothed surface.

In addition to restricting movement through the tight fit of the upper wide edge (112) of each positioning part (11) with the opening of the groove (200), the base (12) of the positioning frame (1) includes a curved bottom surface (121) facing the inner bottom surface of the groove (200). The inner bottom surface of the groove (200) of the aluminum frame (100) is a curved inner bottom surface (201). The positioning frame (1) is installed in the groove (200) with the curved bottom surface (121) fitting against the curved inner bottom surface (201). The fitting between the curved bottom surface (121) and the curved inner bottom surface (201) increases the friction between them, thereby enhancing the stability of each positioning frame (1) within the groove (200). Additionally, the curved bottom surface (121) of the positioning frame (1) further has a rough surface or a toothed surface, as shown in FIGS. 6 and 7, to increase friction and effectively prevent the positioning frames (1) from moving.

To prevent the locking block (2) from detaching from the opening of the groove (200) of the aluminum frame (100), the locking block (2) includes a lower portion (22) and an upper portion (23). The lower portion (22) is semi-cylindrical, while the upper portion (23) is a rectangular prism. The upper portion (23) connects to the flat end of the lower portion (22), while the other end of the lower guide block (22) forms an arc surface (24). The locking block (2) is installed in the groove (200) and positioned between the two positioning parts (11) with the arc surface (24) resting against the base (12).

After the user completes the installation of each positioning frame (1), the locking blocks (2) are inserted sideways and inclined from the opening of the groove (200). Once the locking blocks (2) enter the groove (200) and are positioned between the two positioning parts (11), the arc design of the arc surface (24) guides the locking hole (21) of the locking block (2) to align naturally with the opening of the groove (200), allowing the screw (3) to accurately lock and assemble with the locking block (2). Additionally, the connection between the upper portion (23) and the lower portion (22) further forms two recessed step portions (25).

At the opening of the groove (200) of the aluminum frame (100), there are two parallel flanges (300). These two flanges (300) create a reduced opening (202) at the opening of the groove (200). The screw (3) passes through the reduced opening (202) and locks into the locking hole (21). As the locking block (2) moves towards the reduced opening (202), the two flanges (300) contact against the two step portions (25) to prevent the locking block (2) from detaching through the reduced opening (202) as shown in FIGS. 1, 2, 4, and 5.

While we have shown and described the embodiment in accordance with the present invention, it should be clear to those skilled in the art that further embodiments may be made without departing from the scope of the present invention.

What is claimed is:

1. A solar panel bracket fastening device comprising:

a positioning frame (1) having two positioning parts (11) and a base (12), the two positioning parts (11) each having a first end and a second end, the two respective first ends of the two positioning parts (11) connected to two ends of the base (12), a width of the first end increasing towards the second end of each of the two positioning parts (11), the positioning frame (1) installed in a groove (200) of an aluminum frame (100), with the second ends of the two positioning parts (11) pressing against an opening of the groove (200), the base (12) resting against an inner bottom surface of the groove (200);

a locking block (2) movably installed within the groove (200) and located between the two positioning parts (11) of the positioning frame (1), the locking block (2) having a locking hole (21) defined therethrough, an opening of the locking hole (21) located corresponding to the opening of the groove (200), and a screw (3) movably locked into the locking block (2) and including a screw head (31) and a shaft (32), the screw head (31) formed to one of two ends of the shaft (32), another one of the two ends of the shaft (32) passing through the opening of the groove (200) and locked into the locking hole (21) of the locking block (2), wherein the positioning frame (1) is installed in the groove (200) of the aluminum frame (100), the second ends of the positioning parts (11) press against the opening of the groove (200), a friction between the positioning frame (1) and the aluminum frame (100) is created such that the positioning frame (1) is prevented from detaching from the groove (200), the locking block (2) is confined between the two positioning parts (11) and does not slide or fall off.

2. The solar panel bracket fastening device as defined in claim 1, where the base (12) of the positioning frame (1) includes a curved bottom surface (121) facing a curved inner bottom surface (201) of the groove (200), the positioning frame (1) is installed in the groove (200) with the curved bottom surface (121) resting against the curved inner bottom surface (201) of the groove (200).

3. The solar panel bracket fastening device as defined in claim 2, wherein the curved bottom surface (121) of the positioning frame (1) has a rough surface.

4. The solar panel bracket fastening device as defined in claim 2, wherein the curved bottom surface (121) of the positioning frame (1) has a toothed surface.

5. The solar panel bracket fastening device as defined in claim 1, wherein the two positioning parts (11) of the positioning frame (1) include two side slanted edges (111), the second end of each positioning part (11) is an upper wide edge (112) and the first end of each positioning part (11) is a lower narrow edge (113) which is narrower than the upper side edge (112), the lower narrow edge (113) of each positioning part (11) is formed to the base (12), and each side slanted edge (111) extends upward and outward from two ends of the lower narrow edge (113) and connecting to the upper wide edge (112), a length of each upper wide edge (112) is defined as (T), a length of each lower narrow edge (113) is defined as (P), a width of the opening of the groove (200) of the aluminum frame (100) is defined as (O), wherein (T)> (O)> (P).

6. The solar panel bracket fastening device as defined in claim 1, wherein the locking block (2) includes a lower portion (22) and an upper portion (23), the upper portion (23) is connected to one of two ends of the lower portion (22), and another one of the two ends of the lower portion (22) forms an arc surface (24), the locking block (2) is located in the groove (200) and located between the two positioning parts (11), with the arc surface (24) resting against the base (12), the arc surface (24) directs the opening of the locking hole (21) of the locking block (2) to align with the opening of the groove (200).

7. The solar panel bracket fastening device as defined in claim 6, wherein the connection area between the upper portion (23) and the lower portion (22) forms two step portions (25), the opening of the groove (200) of the aluminum frame (100) has two parallel extending flanges (300) which create a reduced opening (202) at the groove (200), the shaft (32) of the screw (3) pass through the reduced opening (202) and is locked to the locking hole (21), when the locking block (2) moves towards the reduced opening (202), the flanges (300) contact the step portions (25) to prevent the locking block (2) from detaching from the reduced opening (202).

* * * * *